United States Patent [19]
Lyles

[11] 3,942,443
[45] Mar. 9, 1976

[54] ROCKET ASSISTED PROJECTILE

[75] Inventor: Bobby J. Lyles, Huntsville, Ala.

[73] Assignee: Thiokol Corporation, Newtown, Pa.

[22] Filed: July 6, 1973

[21] Appl. No.: 377,158

Related U.S. Application Data

[63] Continuation of Ser. No. 56,569, July 20, 1970, abandoned.

[52] U.S. Cl. ............... 102/49.3; 60/252; 102/39; 102/92.1; 102/99
[51] Int. Cl.² .................................. F42B 15/10
[58] Field of Search .......... 102/49.3, 39, 49.7, 49.8, 102/92.1, 99–103; 60/252, 255, 251, 38, 39

[56] References Cited
UNITED STATES PATENTS

| | | | |
|---|---|---|---|
| 3,067,574 | 12/1962 | Corbett | 60/252 X |
| 3,122,884 | 3/1964 | Grover et al. | 102/103 X |
| 3,628,457 | 12/1971 | Magnusson | 102/49.3 |
| 3,698,321 | 10/1972 | Wall | 102/49.3 |

Primary Examiner—Samuel W. Engle
Assistant Examiner—Harold Tudor
Attorney, Agent, or Firm—Stanley A. Marcus; Thomas W. Brennan; William R. Wright, Jr.

[57] ABSTRACT

An improved projectile suitable for use in artillery pieces, though preferably in the higher calibres, is disclosed wherein projectile range upon launching by the gun is considerably extended by means of a propellant rocket motor in combination therewith which motor is characterized by containing in its combustion chamber a flowable propellant charge in the form of a fluidizable, shapeable propellant charge composition which under the high radial acceleration forces imparted to the projectile when fired from a rifled gun barrel, flows and shapes itself into the shape of a hollow cylinder and, when ignited in flight, burns in the manner of a solid propellant grain of the same shape to aid in propelling the projectile a greater distance than is possible with the gun alone.

10 Claims, 5 Drawing Figures

Bobby J. Lyles
INVENTOR.

Bobby J. Lyles
INVENTOR.
BY Emil W. Milan
ATTORNEY

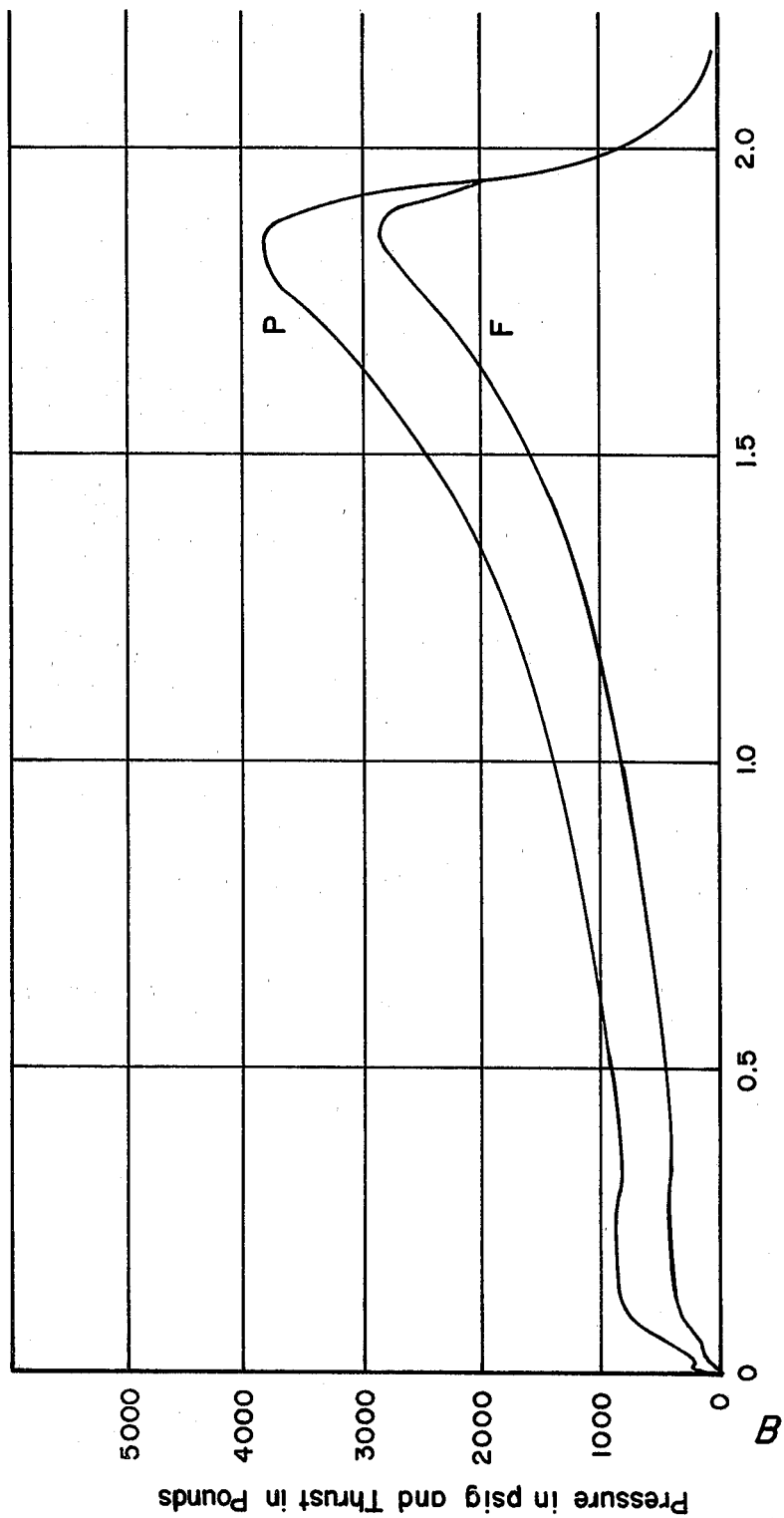

ROCKET ASSISTED PROJECTILE

This is a continuation, of application Ser. No. 56569 filed July 20, 1970 now abandoned.

BACKGROUND OF THE INVENTION

Artisans in the field of rocket propelled missiles have for many years sought to combine the capability of the ordinary cannon, or artillery piece, operating by means of an explosive charge for launching projectiles and the like, with the steady state propulsion efficiency derived from the burning of a solid propellant in a rocket motor. These devices, known as rocket assisted projectiles, or gun boosted rockets, and with which this invention is concerned, have not, up to now, proved entirely satisfactory nor performed in accordance with expectations. Many reasons have been advanced for this, not the least of which is the failure to develop a propellant grain which can withstand the acceleration forces experienced during the difficult launching, or boost phase of the projectile flight, or to develop means to protect the grain. Success has heretofore been elusive most often in the past because of propellant grain cracking, or other similar deleterious effects induced by the high launching acceleration forces to which the propellant is subjected. It is, of course, quite obvious that the rocket motor propellant would be subjected to very high linear, tangential and radial acceleration forces during the launch of the missile and due to the spinning thereof imparted by the lands or rifling grooves on the inside surfaces of the barrel of the gun which fires the projectile. Accordingly, the invention to be hereinafter described provides, by means of a flowable propellant charge, hereinafter more specifically referred to as a fluidizable, shapeable propellant charge composition, and the advantageous use of the radial acceleration forces created by projecting the missile from a rifled gun barrel, a workable and operable rocket assisted projectile, which can be safely launched by means of ordinary field artillery equipment.

SUMMARY OF THE INVENTION

This invention relates to rocket motors; more particularly, it relates to rocket motors adapted for attachment to a gun boosted, or launched, projectile.

It is well known in the artillery art that the range of a gun used to fire projectiles, or other ammunition rounds, can be considerably increased by the use therein of a rocket motor to impart propulsive forces thereto. Such a rocket motor is usually rigidly affixed to the projectile, and the gases evolved from the ignited propellant in the rocket motor provide augmenting propulsion efficiency. Ignition of the rocket motor can be accomplished, after the missile leaves the gun barrel, with a suitably designed ignition system contained within the casing and having a delayed ignition means.

There are, however, other problems in the attainment of an operative rocket motor for projectiles which do not find such easy solutions. A primary concern is the very high acceleration forces experienced by such projectiles when launched from a gun, since unwanted and difficult problems arise therefrom. With respect to the projectile and its warhead pay load, these problems are of relatively little concern since adequate solutions have long been available. However, with respect to the rocket motor, a different situation exists. Motor castings of ample strength have long been available. However, many state-of-the-art propellants are not physically suitably durable for such use. Hence, in providing a rocket motor for augmenting the propulsion of the projectile after launching by the gun, the artisan must insure that a propellant charge, usually in the form of a solid propellant grain is included which is capable of withstanding the launching forces, so that, upon ignition, smooth combustion and, therefore propulsion, is obtained. From the above and other considerations to be hereinafter referred to, it is obvious that a most critical component in a rocket assisted projectile, from the standpoint of satisfactory operation and performance, is the propellant charge and its physical form.

In its preferred embodiment, the present invention sets forth a solution to the problem above referred to by providing a propellant charge in the form of a flowable propellant charge, i.e. a fluidizable, shapeable propellant composition comprising in admixture an inorganic oxidizer material and a fluid fuel matrix material. Preferably, the fluid fuel matrix material is a liquid form of a material usually used as a binder material in rocket propellant compositions, e.g. an uncured form of synthetic polymer, such as uncured carboxy terminated polybutadiene of the type taught in U.S. Pat. No. 3,235,589.

The term "flowable propellant charge" as used herein and in the claims is intended to mean a propellant charge which is a non-rigid, usually viscous, mass which has sufficient viscosity to maintain the solids dispersed in the fluid matrix in a substantially non-settling suspension and which also is sufficiently fluid to flow as a fluid under high radial acceleration forces to assume a cylindrical shape. Essentially, the propellant charge must be a fluid, or fluidizable and shapeable, mass while under the influence of centrifugal forces from radial acceleration forces.

Accordingly, it is an object of this invention to provide a rocket motor in combination with a gun launched projectile for augmenting propulsion of the projectile after exit thereof from the launching gun.

It is another object of this invention to provide a device of the character described which utilizes a fluidizable, shapeable propellant composition charge contained and supported in the propellant combustion chamber of the rocket motor casing, so as to successfully operate even under the extreme accleration forces to which it is subjected during the critical launch period, and especially to operate advantageously with the assistance of the radial acceleration forces imparted to the device when it is fired through a rifled gun barrel or by the other projection means which will impart a sufficiently high rotational speed to the projectile to cause the charge to flow to form the hollow cylindrical shape desired for the charge.

A still further object of this invention is to provide a gun launched, or boosted, projectile, adapted to be propelled, after launching, by a propellant rocket motor, said motor comprising a sealed casing having, preferably, a cylindrical combustion chamber substantially-filled with a flowable propellant charge in the form of a fluidizable, shapeable mass, e.g. as a viscous mass, which, due to the high radial acceleration forces imparted to the casing, flows along the inner side and end walls of the combustion chamber of the casing and assumes the form of a hollow cylinder within the chamber with the longitudinal axis of the cylinder disposed along the longitudinal axis of the projectile.

With the above and other objects and advantages in mind as will become apparent to those skilled in the art to which the invention pertains, the present invention comprises a rocket motor adaptable for use with a projectile fired from a gun. The rocket motor includes a hollow casing having a combustion chamber for retaining the propellant charge, with the chamber essentially having a greater volume than the volume of the charge, a fluidizable, shapeable propellant charge disposed in the chamber in the casing, and an ignition system means associated with the casing, combustion chamber and propellant charge for igniting the propellant charge. In an alternate embodiment, the propellant charge is retained in a substantially-filled, sealed, destructible container which fits into the combusion chamber formed by the hollow casing but which has a total volume less than that of the hollow space in the casing. The aft end of the rocket motor casing communicates with the nozzle of the rocket motor and serves, after the charge is ignited, to conduct to the atmosphere the hot gases produced by the burning propellant charge during the projectile-motor flight. The other end of the casing is affixed by suitable fastening and sealing means to the aft end of the warhead and is insulated suitably therefrom in a known way. The flowable propellant charge, whether or not initially retained in a container, essentially has a volume sufficiently smaller than the combustion chamber space within the hollow casing, thereby permitting the propellant charge to shape itself into the form of a hollow cylinder within the chamber under the forces of radial acceleration during flight, before ignition, and during combustion.

The rocket assisted projectile of the invention may be more readily understood from the following description taken with reference to the drawings, wherein like reference numerals refer to like parts throughout, and in which is described the preferred embodiments of the invention.

BRIEF DESCRIPTION OF THE DRAWING

FIG. 2-a is a cross-sectional view taken along the line 2a-2a of FIG. 2.

FIG. 4 is a chart showing pressure and thrust traces in relationship to time during firing of a rocket motor made and fired according to the invention.

DETAILED DESCRIPTION OF THE INVENTION

Figure 1:
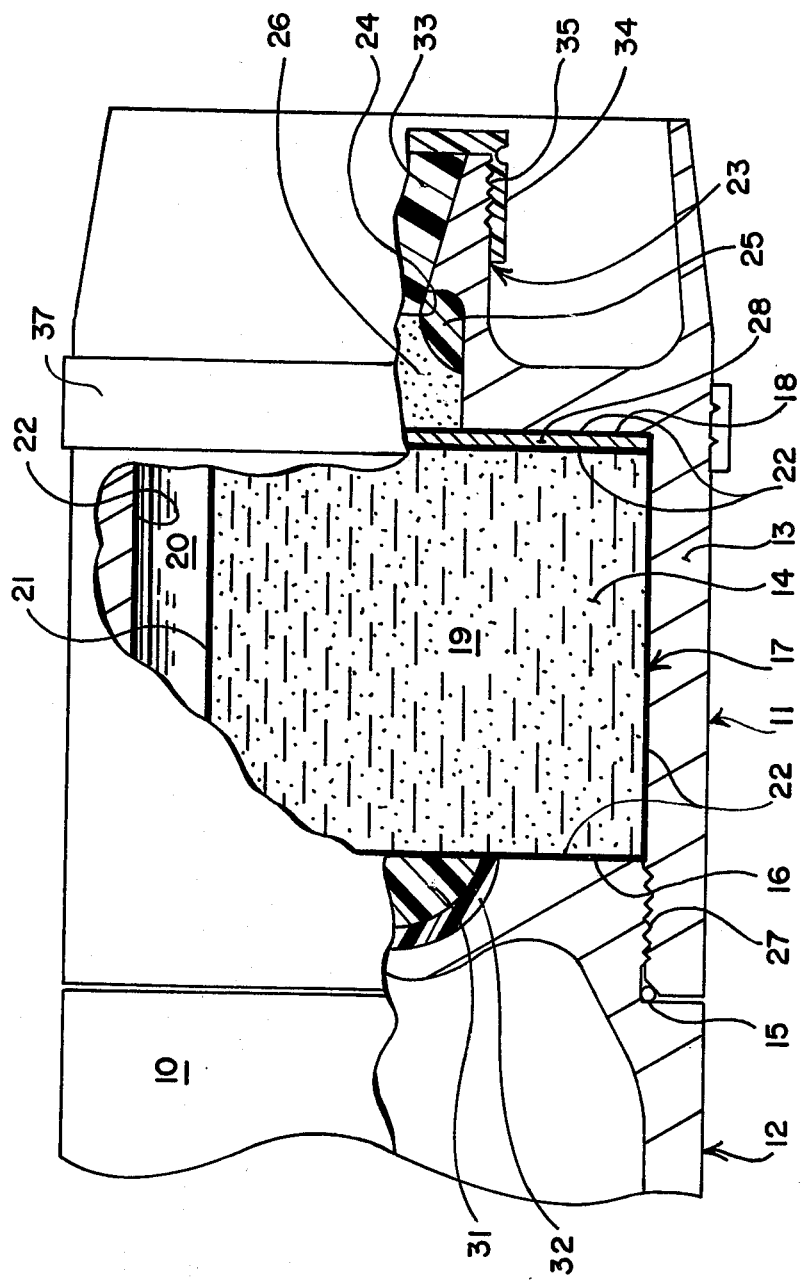
FIG. 1 is a view, partially in section, illustrating one embodiment of a rocket assisted projectile disposed, before projection, in a horizontal position and incorporating a rocket motor of the invention with the flowable propellant charge sealed in the cylindrical combustion chamber of the casing of the rocket motor.
Figure 2:
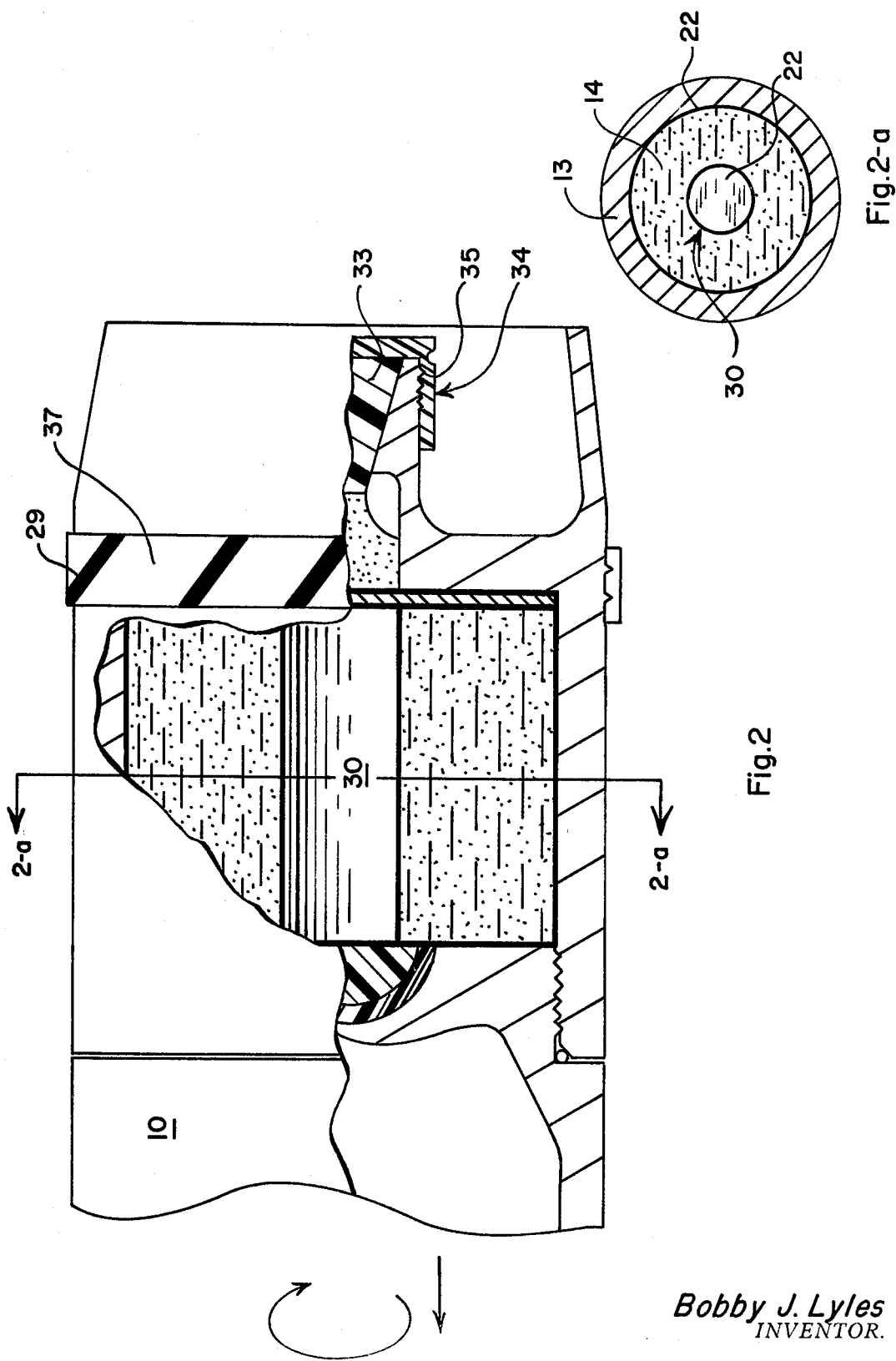
FIG. 2 is a view, partially in section, of the projectile of FIG. 1 in flight, illustrating the shape assumed in flight by the flowable propellant charge after the projectile has left the rifled barrel of a gun under acceleration forces produced by the gun and has attained a centrifugal force, due to radial acceleration produced by the effects of the rifling of the gun barrel on the projectile, to cause the propellant charge to flow to fill the combustion chamber in the shape of a hollow cylinder.

To achieve a more detailed understanding of one embodiment of the invention herein presented, reference can be had to FIG. 1. FIG. 1 shows a rocket assisted projectile 10, in a horizontal position, in a static condition before projection. Included by attachment thereto is a rocket motor 11 and a warhead 12. Motor 11 comprises a casing 13 of steel, or other suitable pressure vessel material such as reinforced fiberglass, or a laminate thereof to obtain a structure capable of withstanding high internal pressures and external forces. Casing 13 is fastened to the warhead 12 by threads 27 and is sealed against leakage by an O-ring seal 15. Casing 13 is hollow and encloses between end wall 16 of the warhead 12 and its inner side wall 17 and its end wall 18 a combustion chamber 19. Contained in the chamber 19 in casing 13 is a flowable propellant charge 14 which is fluidizable and shapeable and which is comprised of, preferably, a particulate form of inorganic oxidizer, e.g. ammonium perchlorate, aluminum powder fuel, and a fluid polymer fuel, such as, an uncured, liquid carboxy terminated polybutadiene. Propellant 14 is prepared as in hereinafter described and is poured into the open end of the casing 13 in a quantity such that when the casing 13 is threaded and fastened to warhead 12 by means of threads 27 and combustion chamber 19 will be filled to about 80 to 95% of its total volume, leaving a void space 20 within the casing. The casing 13 is then fastened to warhead 12, with O-ring 15 is position therebetween. The location of the void space 20 will, of course, depend on the position relative to ground level in which projectile 10 is resting before projection. For example, if the projectile 10 were placed in a vertical position, the void space would be adjacent to the end wall 16 of the warhead 12. If the projectile were tilted along its longitudinal axis to any position between vertical and horizontal, the top surface 21 of the propellant charge 14 would in time move by gravity to find it level position level to the earth' surface, with the void space 20 appropriately positioned adjacent thereto. A liner or insulator 22 of a carbon-filled rubbery material preferably is deposited on the surfaces 16, 17 and 18 of chamber 19 in casing 13 before adding the propellant charge 14 to the chamber 19. The liner 22 bonds to the surfaces and insulates the propellant from the heat of the gun barrel and protects the casing 13 and the warhead 12 from the heat of the burning propellant charge 14 when it burns during flight. The exact insulating and bonding materials employed in liner or insulator 22 are well known in the art and any of such can be selected for use with a particular propellant composition. As will also be more fully explained in what follows, the flowable propellant 14 is selected and formulated to be capable of readily flowing outwardly against the side inner wall 17 of the chamber 19 during the high radial acceleration phases of projectile 10 as it leaves the rifled gun barrel (not shown) from which it is projected. Referring now briefly to FIGS. 2 and 2-a, under the centrifugal forces in the rifled gun barrel, the void space 20 is displaced from its location adjacent to surface 21 into the charge 14 to create a cylindrical channel 30, as shown in FIG. 2, running through the charge 14 and extending between the end wall 16 of the warhead 12 and the bottom inner wall 18 of the casing 13 and forming a web of propellant 14 extending from the channel 30 to the liner 22 of casing 13, as shown in FIG. 2-a.

Referring again to FIG. 1, the rocket motor 11 is provided with an exhaust nozzle 23, which is insulated at its throat 24 with a throat insert 25 made preferably of a known erodable insulating material, e.g. phenolic resin-graphite. An igniter system 26 is positioned and retained in casing 13 head of nozzle 23, between the throat 24 and the end wall 18 of casing 13. Liner 22 protects the igniter system 26 from contact with propellant charge 14.

The igniter system 26 is further protected from contact with the propellant charge 14 by a shield 28 of a frangible material, e.g. PLEXIGLAS, poly(methyl methacrylate), or metal, material, and the propellant charge 14 is further protected by shield 28 from heat transfer through end wall 18 of the casing 13 arising from the heat of the propellant used to propel the projectile from the gun barrel (not shown).

Referring now more fully to FIG. 2, the projectile 10 is illustrated in flight after the projectile has left the gun barrel from which it was propelled. The propulsion of the projectile 10 through the gun barrel subjects the projectile to a rotation due to the effect of the rifling of the gun barrel on the rotation band 37 of the projectile, shown by marks 29 left on the band by the lands of the rifling in the gun barrel. For example, in its passage through the gun barrel of a 155 mm. Howitzer, the projectile attains a rotational speed of about 10,000 to 12,000 rpm in about 10 milliseconds. Propulsion of the projectile through the gun barrel subjects the flowable propellant charge 14 to a combination of longitudinal, tangential and radial, or centrifugal, forces. When the radial forces become sufficiently strong to overcome the effect of the longitudinal acceleration forces upon the propellant mass, the flowable mass of propellant 14, acting under the centrifugal force to which it is being subjected, flows outwardly from the longitudinal axis of the mass and distributes itself in the combustion chamber 19 of the casing in the form of a hollow cylinder having a cylindrical channel 30 which extends between the liner 22 on the end wall 16 of the warhead 12 and the liner 22 on the shield 28 at the aft end of chamber 19. The volume of propellant charge 14 present in the chamber 19 preferably is such that the diameter of the channel 30 is about the same as the diameter of the igniter system 26.

The warhead 12 is preferably provided with a first body of insulation 31, preferably phenol resin bound graphite, further embedded in a second body of insulation 32 preferably phenol resin bound asbestos, to protect the warhead opposite the cylindrical passage 30 from the effects of the hot spinning combustion gases 36. (FIG. 3.)

The igniter system 26 is preferably provided with an inertially activated arming device (not shown) of a known type with an appropriate time delay means (now shown) also known, which sets off an igniter or fuse means (not shown) also known, causing the igniter system to ignite the propellant charge 14 in flight after the propellant mass has flowed into the hollow cylindrical shape and the projectile is a safe distance from the gun.

The rocket exhaust nozzle 23 preferably is provided with an expellable body of insulation 33, preferably phenol resin bound graphite, which protects the igniter system 26 from being ignited by the heat of the gun propellant when it burns to propel the projectile 10. The casing 13 is provided with threads 35 on the outer wall of the nozzle 23 for receiving threads of a sealing cap 34 which further protects the igniter 26 and insulation 33 from the blast of the gun propellant.

Figure 3:
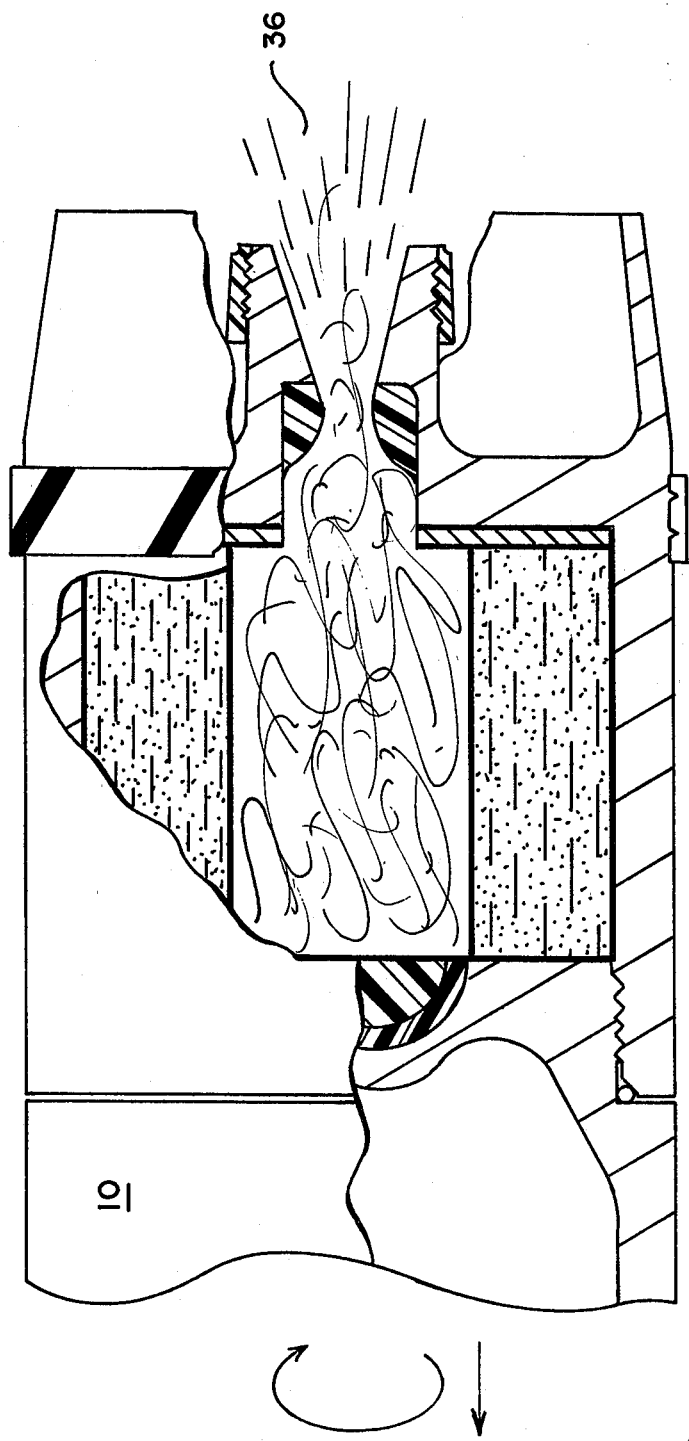
FIG. 3 is a view, partially in section, of the projectile of FIGS. 1 and 2 in flight, illustrating the rocket motor in operation after ignition of the flowable propellant charge and under the continuing effects of radial acceleration while also under the added propulsive forces provided by the rocket motor exhaust gases.

Referring now to FIG. 3, the projectile 13 is shown in flight shortly after the igniter system 26 has functioned to ignite the propellant 14. Upon ignition of the propellant charge 14, the gases formed by combustion of the propellant generate sufficient pressure to cause the cap 34 to be forced from the nozzle 23 and for the insulation 33 to be forced out of the nozzle 23. The throat of the nozzle 24 is then clear for passage of the exhaust gases through the nozzle 23 for propelling of the projectile 10 by means of rocket motor 11.

The flowable propellant charge 14 is maintained in its hollow cylindrical shape throughout its burning by the continuing centrifugal forces acting upon the charge due to the continuing rotation of the projectile 10. Combustion of the propellant charge 14 will be substantially completed before the centrifugal forces acting on the charge 14 become less dominant than the continuing longitudinal forces which are at this time accentuated by the propulsive forces created by the burning of propellant charge 14.

The radial acceleration forces acting on the mass of flowable propellant charge 14 will, of course, depend upon the spin rate of the projectile 10, the density of the propellant, and the distance of the propellant 14 from the longitudinal axis of the projectile 10. For example, in a rocket motor casing 13 having an internal motor length of about 10 inches and and an inside diameter in its combustion chamber 19 of about 5 inches, when partially-filled to about 80% of its volume with a flowable propellant charge 14 weighing 9.6 pounds and having a specific gravity of about 1.65 and spun in a test stand, at 6,000 rpm on its longitudinal axis, formed a hollow cylindrical channel, or passageway, 30 having a diameter of 1.9 inches. Advantageously, the specific gravity of the propellant 14 will preferably be in the range of from about 1.5 to 1.9. The web of propellant charge 14 measured about 1.54 inches. The centrifugal force at the inside wall of the web was calculated to be about 1,900 gravities (g) and to be about 2,500 g at the outside wall of the web. The propellant charge 14 used in making these gravity calculations by weight consisted of about 82 parts of ammonium perchlorate, 17 parts of liquid carboxy-terminated polybutadiene propellant binder in an uncured state, and about 1 part of carbon black powder. The propellant charge had the consistency of a thick, viscous paste which slumped and flowed when a slight pressure was applied against its surface.

Upon ignition of the propellant charge 14, the propellant burns radially in the manner of an internally burning cylinder of solid propellant grain. A graph of the pressure in chamber 19 plotted against time of burning will show a highly progressive trace or curve, with the maximum pressure being reached at or near burnout time, as shown, for example, in FIG. 4 of the drawing.

Because of the progressivity of the pressure-time curve or trace, and the high ratio of maximum to average pressure that would normally be encountered with radial burning of propellant charge 14, the throat insert 25 can be made advantageously of an ablative material. A preferred ablative material is a molded phenolic resin filled with asbestos. However, other ablative materials, such as an erosive graphite may also be used advantageously. With an ablative or eroding throat, the throat increases in diameter as the burning surface area of the propellant charge 14 increases. This permits operation of the motor 11 at a higher average pressure, thereby achieving higher rocket-projectile performance.

The flowable propellant charge 14 may comprise any admixture of oxidizer and fuel materials which, with or without the added presence of a liquid matrix material, forms a homogeneous, fluidizable, shapeable mass suitable for use as a flowable rocket propellant charge according to the invention herein disclosed.

Suitable oxidizer materials include inorganic oxidizing salts, for example, ammonium, alkali metal, or alkaline earth metal salts of nitric, perchloric or chloric acids or mixtures thereof. More particularly, suitable oxidizer materials are sodium, potassium, magnesium and ammonium perchlorates; lithium and strontium chlorates; and potassium, sodium, calcium and ammonium nitrates. Ammonium perchlorate is especially suitable as the oxidizer material because of its wide spread use and availability for use in rocket propellant formulations. The propellant charge 14 will usually comprise about 60 to 90% by weight of oxidizer material.

The fuel material in the propellant charge 14 preferably is a liquid fuel which serves both as a matrix for the oxidizer material and as a fuel for combustion thereby. Suitable fuel materials include uncured synthetic polymers. Accordingly, the polymer may be any fluid polymer used in the propellant formulating arts. A wide variety of suitable fluid polymers are known to the art and such polymers can be mixed with the oxidizer and other additive ingredients but left in a liquid, uncured state. These include, for example, polyalkyl hydrocarbons, e.g. polyethylene and polybutadiene and its co-polymers, e.g. GR-S rubber and Hycar; liquid polysulfide polymers, e.g. LP-2 and LP-32; polyethers; polyesters, particularly hydroxy-terminated polyesters; polyfluorocarbons, e.g. Kel-F; natural rubber; polychloroprene; butyl rubber; and uncured oil-enriched GR-S rubber, natural rubber, and polybutadiene, such as those taught in U.S. Pat. No. 2,991,166, incorporated herein by reference. Preferably, the oils used in the latter oil-enriched rubbers and polymers are mineral oils of the paraffinic, aromatic or naphthenic types having pour points ranging from about −10° to 50°F. Light petroleum oils, such as kerosene, advantageously may be used to make the rubber or polymer more fluidizable for use in the propellant charge. As pointed out in the patent, the oil-rubber compositions can contain from 1 to 25 parts of oil per part of rubber, but typically will be about 4:1. Uncured propellant product made according to the patent may be quite fluid and can readily be poured and used to provide a flowable propellant charge for use in the practice of the present invention. Of course, the curing agents described in the patent are to be omitted from the formulations described in the patent when the formulations are adapted for use in the present invention. Other suitable fluid polymeric binders will be found among those described in U.S. Pat. Nos. 3,235,589; 3,257,801; 3,260,208; 3,158,991; and 3,068,129, all incorporated herein by reference.

Solid fuels, such as finely divided metal or non-metal powders, also can be introduced in known quantities into the propellant matrix to enhance the specific impulse of the flowable propellant charge 14. Such powders include Al, Mg, Zr, B, Be, Ti and Si, preferably Al. The metal particles preferably should be within a size range of about 0.25 to 50 microns. Even very small amounts of the solid fuel powder, e.g. 1 or 2% by weight, increase the density of the propellant mass and its heat of combustion. Usually from about 1 to 10% by weight of solid fuel powder will be included in a stoichiometrically balanced propellant formulation while retaining its flowable characteristics for practice of the invention.

The ratio of fuel materials to oxidizer materials in the propellant charge should be at or close to a stoichiometric ratio in order to promote efficient combustion.

Other additives may be incorporated into the propellant charge composition to obtain optiumum burning rate and other desired characteristics. These include, for example, burning rate catalysts, such as ammonium dichromate, copper chromite and ferric ferrocyanide; coolants for reducing the temperatures of the generated gases where necessary to preserve the nozzle configuration and to avoid overheating the warhead of the projectile, such coolants being, for example, monobasic ammonium phosphate and ammonium oxalate.

Pour point depressants, such as known organic phosphate compounds, may also be incorporated with oil fuels or oil-enriched rubbers and polymers to ensure flowability of the propellant charge at low ambient temperatures.

Dyes and metal oxide colorants may also be incorporated into the matrix to produce a colored exhaust for tracer purposes.

The flowable propellant charge may be prepared by the usual known methods used in preparing rocket propellant formulations. However, the addition of curing agents and curing the propellant mass ore omitted. In general the fluid fuel matrix will be blended with the oxidizer material and with the solid fuel material, if one is used, along with other additives until a homogeneous mass is obtained. The ratio of fluids to solids will be kept sufficiently low to minimize sedimentation of the solids.

In an advantageous form, the flowable propellant charge will be a thixotropic propellant, such as taught, for example, in U.S. Pat. No. 3,197,348, incorporated herein by reference, and will contain a finely divided particulate material, e.g. silica, uniformly dispersed in the liquid component as a thixotropic agent for rendering the propellant mass thixotropic. Suitable particulate material will have a particle size less than 20 millimicrons and will be selected from silica, carbon and finely divided metals. The amount of such thioxtropic agent will be present in a concentration of from about 1 to about 5% by weight of the propellant charge.

The flowable propellant charge will have a viscosity such that whether the charge is in liquid, thixotropic, colloidal or pasty form, the charge will be sufficiently fluidizable and shapeable into the hollow cylindrical form shown in FIG. 2 of the drawing during flight of the projectile 10.

The invention is further illustrated by the following examples.

EXAMPLE I

A rocket motor having a partially-filled (about 80% by volume) steel casing combustion chamber containing 9.6 pounds of a slurried (flowable) propellant mixture consisting by weight of 82% ammonium perchlorate (oxidizer grade), 1% carbon black, and 17% of a liquid polymer, a liquid carboxy-terminated polybutadiene polymer, ave. m.w. approx. 3,600, (without cure agents), was installed horizontally in a spin stand and spun about its longitudinal axis to a rate of 6,000 revolutions per minute (rpm), in 50 seconds. When the desired spin rate was reached, the rocket motor was X-rayed by means of a Pulse X-ray machine. The X-rays taken at 6,000 rpm were compared with X-rays taken prior to spin. Before spin, the propellant slurry was observed to be lying horizontally in the motor and the free volume was located at the top of the motor. At 6,000 rpm, the X-rays showed that a clearly defined symmetrical port (or channel) was present in the center of the propellant along the entire length. The diameter of the port was 1.9 inches, confirming calculations of the free volume available. That is, al of the available free volume was centered about the longitudinal axis. The internal motor length was just under 10 inches and the inside diameter of the motor case was slightly less than 5 inches, giving a propellant (web) thickness of 1.54 inches. This experiment confirmed the formation of an internal channel, i.e. a hollow cylinder, under spin conditions where the calculated radial acceleration forces acting on the propellant ranged from 1,900 gravities (g) at the inner bore and up to 2,500 g adjacent to the case (at maximum propellant diameter).

EXAMPLE II

The same rocket motor described in Example 1 was allowed to remain in an horizontal position for about four hours and then was spun to 11,800 rpm in 55 seconds, and Pulse X-rays were taken again. The latter X-rays did not show any difference from those obtained at 6,000 rpm. That is, the port diameter of 1.9 inches was again observed with no anomalies resulting from the spin rate that subjected the propellant to radial accelerations ranging from 3757 g at the inner bore to 9886 g adjacent to the case.

EXAMPLE III

A rocket motor having a casing with the same dimensions as the casing of Example 1 and containing 9.6 pounds of the same flowable propellant charge composition was spun in a static (spin) test stand to 6,000 rpm and ignited with a steel igniter means, while at this spin rate. Pressure and thrust were measured during motor operation. The calculated propellant port diameter (formed as a result of spin) was found by means of Pulse X-ray to be 1.9 inches. The propellant web thickness, similarly measured, was 1.54 inches; and the web fraction of the diameter was calculated to be 61.9%. The progressive pressure and thrust measurements showed that the rocket motor generally responded in the manner of a spinning rocket motor burning a cylindrically perforated solid grain configuration. The test therefore, was considered to be successful. However, the pressure and thrust showed severe fluctuations in amplitude that detracted from a "clean" combustion. The oscillations apparently were caused by "combustion instability" of the propellant, a phenomenon that was not specifically associated with the fact that the propellant was in slurry form. In evaluating the hardware (after-test), it was noted that the steel igniter had melted off and that globules of molten metal had been slung through the propellant. Since it was believed that the latter anomaly could have triggered and aggravated the combustion instability, the igniter was redesigned and a subsequent test made utilizing the same propellant composition. Test data are shown in Table 1.

EXAMPLE IV

A second spin firing test conducted with the same slurry propellant charge composition as was used in Example 1, in a rocket motor which was the same as was used in Example 3, at 6,000 rpm. This test incorporated a new igniter system design also, the propellant weight was increased to 10 pounds, thereby resulting in a web fraction of 70% of the diameter under radial acceleration. In other respects, this test was a repeat of the previous test. Again, the motor operated with a progressive pressure and thrust versus time as expected, but the combustion instability experienced in the previous test recurred with oscillations of lower amplitude than were experienced previously. Although this test further demonstrated the feasibility of the flowable propellant concept, the occurrence of propellant combustion instability again confounded the results. It was therefore decided to change the propellant composition (to get away from the combustion instability) and to test a third motor at a higher spin rate, representing a far more severe test condition. Test data are shown in Table 1.

EXAMPLE V

A spin firing test was conducted using an aluminized slurry propellant charge composition. The propellant composition weighed 10.15 pounds and consisted by weight of 79% ammonium perchlorate (oxidizer grade), 5% of aluminum powder (propellant grade), and 16% of liquid carboxy-terminated polybutadiene polymer (as in Example I). The rocket motor and igniter were of the same design as those used in Example IV. Due to mechanical difficulties with the spin stand, this motor was spun twice (once to 10,800 rpm and then again to 10,200 rpm) before firing. This constituted a more severe exposure condition for the propellant from the standpoint of solid particle settling than was originally intended. Nevertheless, the test was an unqualified success. The propellant burned very smoothly, without any oscillations in pressure or thrust, under radial accelerations ranging from 2275 g (gravities) at the inner bore to 7,388 g at the case wall. Pressure and thrust were progressive and in general the trace shape matched expectations for the spin exposures involved. The unplanned dual spin-up did apparently cause some solid particle settling that affected burning rate, but the actual spin durations in the tests were far in excess (and, therefore, far more severe) of tactical requirements for applications of the rocket motor in rocket assisted projectiles. Therefore, no settling problem is anticipated with this propellant composition during flight of projectiles of this invention. The incorporation of 5% aluminum powder in the propellant formulation eliminated the combustion instability experienced in Example IV. Since the motor was spinning during burning, some of the solid combustion products (of the aluminum) remainted in the motor as slag deposit. However, the slag deposit was evenly distributed within the casing, so that no adverse effect on the ballistics performance of the projectile should occur.

The data of the rocket motor firing test results for Examples III, IV and V are shown in Table 1. It is shown that, with the preferred, aluminum-containing propellant composition of Example V, that a maximum pressure, $P_{max}$, of 3875 psia and a maximum force, $F_{max}$, of 2890 $lb_f$ (pounds force) were obtained, with a specific impulse (200–200 psia) of 221.9 lb-sec/lb. These data compare favorably with the data obtained when firing a solid propellant grain made of the propellant composition of Example V but including a curing agent and burned in a cured state.

The chart traces of the $P_{max}$ and $F_{max}$ obtained in Example 5 during firing are shown in FIG. 4. The traces show that the slurry propellant composition under radial acceleration at 10,200 rpm ignites and burns smoothly to attain maximum force in less than 2 seconds.

The test stand data will make clear to one skilled in the design and manufacture of rocket assisted projectiles how to practice the invention to obtain the benefits and advantages thereof. It will also be clear to those skilled in the art that the invention may be practiced in other embodiments where a flowable propellant can be subjected to centrifugal forces to shape the propellant into a form which has a cylindrical channel along its longitudinal axis and an exterior shape which may be cylindrical, spherical or ellipsoidal in form.

Although the flowable propellant has been shown in an embodiment wherein the propellant is deposited in a free flowing state within the casing of rocket motor, it also will be found advantageous to prepackage the propellant loosely or compactly in a sealed bag or carton type container which can be placed in the casing during assembly of the projectile. In such an embodiment, the container will be sufficiently expandable, flexible or frangible so that under the influence of the centrifugal forces of radial acceleration acting upon the projectile in the gun barrel from which it is projected, and in flight, the flowable propellant will shape itself to the form of a body of propellant having a hollow cylindrical channel along its longitudinal axis. The propellant can then be ignited and fired in the manner described above.

Also, although the igniter system 26 has been shown located at the aft end of the rocket motor, it will be found advantageous in some rocket motor designs to place the igniter system at the aft end of the warhead 12. In such an embodiment, the insulations 31 and 32 will be recessed to accommodate the igniter system in a known way. The space occupied by igniter system 26 in FIGS. 1 and 2 may then be left unfilled. Upon firing the igniter of the igniter system in flight, the igniter will ignite the shaped flowable propellant from its forward end and the gases of combustion will flow out the exhaust nozzle 23 of the rocket motor 11 in the manner shown in FIG. 3.

While the invention is directed in its preferred embodiments to a rocket assisted projectile, the invention will also be useful for generation of combustion gases in a gas generator means, which means may be the combustion chamber of a rocket motor not in combination with a warhead of a projectile. The gas generator means may also be in the form of a portable or fixed rocket motor casing which is provided with means for rotation, such as a direct or friction drive from an electric motor or a fluid drive from a hydraulic transmission, which will spin the casing as was done during the tests described in the Examples.

The combustion gases so produced may be used in a known way, as described, for example, in U.S. Pat. No. 3,258,917, for driving a turbine, reciprocating engine, or the like or in any application requiring high temperature or high pressure gas as the source of energy. For example, the hot combustion gases from a series of gas generators operated as described in this invention and positioned along a runway of an airport can be used to rapidly de-ice the runway. For such use, the flowable gas generator composition preferably will be placed in a container which can be kept warm and which can be rapidly inserted into the gas generator means just before spin-up of the combustion chamber of the gas generator at time of use.

TABLE 1

SUMMARY OF ROCKET MOTOR FIRING TEST RESULTS

|  | Example III | Example IV | Example V |
|---|---|---|---|
| Liner Weight (case only), lb. | 0.51 | 0.50 | 0.49 |
| Propellant Specific Weight (calculated $lb_m/in.^3$ | 0.0595 | 0.0595 | 0.0601 |
| Propellant Weight, lbs. | 9.6 | 10.0 | 10.15 |
| Web Fraction (includes liner),% | 61.9 | 70 | 70 |
| Web Thickness (propellant only), in. | 1.542 | 1.716 | 1.716 |
| Port Diameter (calculated, initial), in. | 1.9 | 1.54 | 1.54 |
| Type Igniter Case | Steel | Fiberglass | Fiberglass |
| Test Temperature | Approx. 70°F | Approx. 70°F | Approx. 70°F |
| Nozzle Throat Diameter (initial) in. | 0.632 | 0.632 | 0.650 |
| Spin Rate, RPM | 6009 | 5970 | 10,200* |
| Spin Time Prior to Ignition, sec. | 60.6 | 58.0 | * |
| Ignition Delay Time, $t_d50$, sec. | 0.016 | 0.014 | 0.040 |
| $P_{max}$, psia | 2535 | 1715 | 3875 |
| $F_{max}$, $lb_f$ | 1700 | 1240 | 2890 |
| Burn Time (200–200 psia), sec. | 3.050 | 3.965 | 2.085 |
| $P_{avg.}$, (200–200 psia) | 1198 | 895 | 1696 |
| $F_{avg.}$, (200–200 psia), $lb_f$ | 699 | 554 | 1080 |
| Total Impulse (200–200 psia), lb.-sec. | 2132 | 2196 | 2252 |
| Specific Impulse (200–200 psia), lb.-sec./lb. | 222.1** | 219.6** | 221.9** |

*This motor was spun twice. The first spin-up went to 10,800 rpm in 90 seconds, followed by a 30-second coast at 10,800 rpm and then 60 seconds to a stop. The second spin-up was to 10,200 rpm in 60 seconds.
**Specific impulse values are based on weight of propellant loaded, rather than "weight burned". In Example 5, residual slag weighing 0.676 lb. remained in the case after firing.

I claim:

1. In a rocket assisted projectile adapted to be ejected from a rifled gun barrel and comprising, in combination, a warhead and a rocket motor fixedly attached to the aft end of said projectile, said rocket motor comprising a combustion chamber containing only a combustible propellant charge for producing rocket propulsive gases upon combustion of said charge, an exhaust nozzle communicating with said chamber only during combustion periods for conducting said propulsion gases from said chamber to propel said projectile but closed to said chamber prior to combustion by a rupturable closure, and means for igniting said charge, the improvement comprising:

said combustible propellant charge being an uncured slurry of an inorganic oxidizer and a liquid fuel and in the form of a flowable and shapable viscous fluid the volume of which is less than the volume of said chamber so as to provide a free space therein said charge, in response to centrifugal force generated by the rotation of said projectile and rocket motor imparted thereto by the riflings in said gun barrel, flows radially and longitudinally to shape itself into a hollow body of revolution having a central substantially cylindrical structurally fully unsupported core and an outer surface configuration conforming to the inner configuration of said chamber and, said free space being displaced to form said central core.

2. The projectile according to claim 1 wherein the propellant composition further includes suspended particles of a solid fuel.

3. The projectile according to claim 2 wherein the solid fuel is selected from Al, Mg, Zr, B, Be, Ti and Si.

4. The projectile according to claim 1 wherein the propellant composition includes at least one inorganic oxidizing salt selected from ammonium, alkaline metal and alkaline earth metal salts of nitric, perchloric and chloric acids.

5. The projectile according to claim 1 wherein the liquid fuel portion is selected from liquid synthetic polymers and liquid rubbers.

6. In a gas generator having a walled combustion chamber for generating gases containing only a combustible charge disposed within said chamber, a discharge nozzle communicating with said chamber after combustion has occurred for conducting gases obtained from combusting said charge from said gas generator but closed to said chamber prior to combustion by a rupturable closure, means for igniting said charge, and said generator rotating rapidly about its axis coincident with the longitudinal central axis of said discharge nozzle, the improvement comprising said combustible charge being an uncured slurry of an inorganic oxidizer and a liquid fuel and in the form of a flowable and shapeable viscous fluid propellant the volume of which is less than the volume of said chamber so as to provide a free space in said chamber said charge, in response to the centrifugal force generated by rapid rotation of said chamber flows as a viscous fluid radially and longitudinally to shape itself into a substantially hollow cylinder having a structurally unsupported central core and an outer surface configuration confirming to the inner surface configuration of said chamber and, said free space being displaced to form said central core of said shaped combustible charge.

7. The gas generator according to claim 6 wherein the propellant composition further includes a solid fuel.

8. The gas generator according to claim 7 wherein the solid fuel is selected from Al, Mg, Zr, Ve, Ti and Si.

9. The gas generator according to claim 6 wherein the propellant composition comprises at least one inorganic oxidizing salt selected from ammonium, alkaline metal and alkaline earth metal salts of nitric, perchloric and chloric acids.

10. The gas generator according to claim 6 wherein the liquid fuel is selected from liquid synthetic polymers and liquid rubbers.

* * * * *